UNITED STATES PATENT OFFICE.

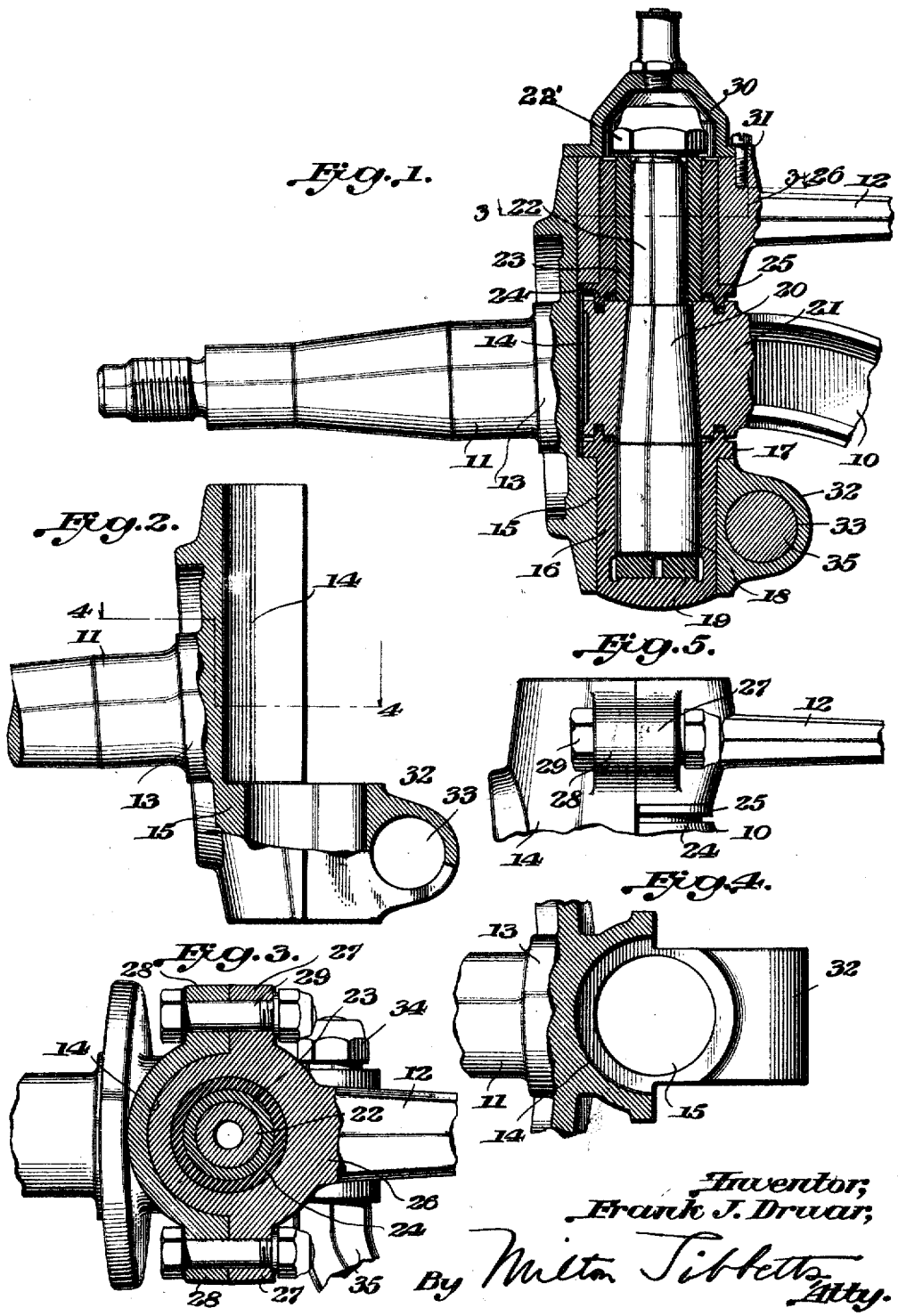

FRANK J. DRUAR, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

1,422,346.   Specification of Letters Patent.   Patented July 11, 1922.

Application filed February 10, 1919. Serial No. 275,940.

*To all whom it may concern:*

Be it known that I, FRANK J. DRUAR, a citizen of the United States, and resident of Detroit, Wayne County, State of Michigan, have invented certain new and useful Improvements in Motor Vehicles, of which the following is a specification.

This invention relates to motor vehicles and more particularly to steering knuckles for such vehicles.

One object of the invention is to provide a steering knuckle assembly which may be readily taken apart.

Another object of the invention is to enable fewer connecting bolts to be employed.

Another object of the invention is to take the tension from the bolts connecting the steering lever with the spindle structure.

Another object of the invention is to enable the spindle knuckle to be more readily machined than with the usual construction.

Other objects of the invention will appear from the following specification.

The invention is embodied in preferable form in the construction and arrangement described in this specification and illustrated in the accompanying drawings in which:

Fig. 1 is a side elevation partly in vertical section of a steering knuckle embodying the invention;

Fig. 2 is a similar view showing the spindle knuckle member alone;

Fig. 3 is a horizontal section on the line 3—3 of Fig. 1;

Fig. 4 is a horizontal section on the line 4—4 of Fig. 2; and

Fig. 5 is a detail side elevation of the upper steering lever knuckle section and its connected spindle knuckle section.

Referring to the drawings, 10 is the axle, 11 the wheel spindle and 12 a steering lever.

Formed integral with the wheel spindle is a main section 13 forming part of one of the knuckle members, the other member of which is fixed to or is part of the axle 10. The upper portion of this section 13 is formed with an unbroken, vertical curved wall 14, having a uniform radius throughout, the center of the curve of the surface of this wall being the center of the knuckle. This uninterrupted surface permits the ready insertion of a machine tool within the area of the section, enabling the machining thereof to be readily carried out.

The vertical, curved part 14 joins the upper surface of a lower integral pivot bearing section of socket member 15. In the socket of this member is suspended a hollow cup 16, having an upper flange 17 resting on the upper surface of the socket member 15. This cup receives the lower cylindrical section 18 of the knuckle pivot pin, the lower end of which bears upon the thrust plate 19, and the cup forms a retainer and reservoir for the oil admitted around the pin. The central portion 20 of the pivot pin is tapered and is seated in the knuckle member 21 of the axle. The upper reduced cylindrical section 22 of the pivot pin is surrounded by a bushing 23 mounted within a sleeve 24 having a lower flange 25. A nut 22' on the threaded upper end of the pivot pin bears against the upper end of the bushing 23 and secures the pin in its tapered seat in the member 21.

An annular knuckle member section or pivot bearing section 26, which is integral with the lever 12, surrounds the sleeve 24 and its outer surface fits against the semicylindrical wall 14 of the main section 13 of the spindle knuckle member, while its lower edge bears against the flange 25 of the sleeve 24. This bearing section 26 is provided with exterior, opposite radial ears 27 adapted to fit against the ears 28 of the section 13, and to be detachably secured thereto by means of bolts 29 extending laterally of the pivot. A cap 30 having a flange 31 is bolted to the member 26 over the nut 22' and provides a suitable oil chamber for the knuckle.

The lower pivot bearing section or socket part 15 is provided with an ear 32 having an opening 33, through which is passed a bolt 34 adapted to be secured to an arm 35 of a steering connecting rod.

The socket member or bearing section 15, being integral with the spindle, avoids the necessity for the use of clamping bolts required in the usual two-piece eye, while such integral construction in connection with the one-piece bearing section 26, integral with the lever 12, provides an arrangement that takes up the downward thrust and prevents side strain and thus takes the tension from bolts 29.

The parts may be readily disassembled by releasing the bolts 29, lifting the knuckle section 26, and also the members 23 and 24 and moving the spindle and axle relatively in a vertical direction.

Having thus described my invention, what

I claim and desire to secure by Letters Patent is:

1. In a steering knuckle, the combination with a knuckle member comprising an axle and a pivot pin, of a second knuckle member comprising a wheel spindle having a section formed with an interiorly curved seat, a separately formed pivot bearing section surrounding said pivot pin and having an exteriorly curved surface fitting said seat, and laterally extending means detachably securing said bearing section in place.

2. In a steering knuckle, the combination with a knuckle member comprising an axle and a pivot pin, of a second knuckle member comprising a wheel spindle having a section formed with an interiorly curved seat, an integral pivot bearing section surrounding said pivot pin, a separately formed pivot bearing section surrounding said pivot pin and having an exteriorly curved surface fitting said seat, and laterally extending means detachably securing said bearing section in place.

3. A steering knuckle member comprising a spindle, two separated pivot bearing sections one of which is integral with the spindle and the other of which is separately formed, and means extending laterally of the pivot axis for detachably securing the separately formed section to the spindle in line with the integral section.

4. A steering knuckle member comprising a spindle, a pivot bearing section formed integral therewith, and a second pivot bearing section detachably secured to the spindle and having a steering lever formed integral therewith.

5. A steering knuckle member comprising a spindle, a pivot bearing section formed integral therewith, a second pivot bearing section having an integral steering lever, and laterally extending fastening means for detachably securing said second pivot bearing section to the spindle.

6. A steering knuckle member comprising a spindle, a pivot bearing section formed integral therewith, a second pivot bearing section having an integral steering lever, and laterally extending bolts for removably securing said second section to the spindle.

7. A steering knuckle member comprising a spindle, a main section integral with the spindle and having an interiorly curved seat, a pivot bearing section adapted to fit against said seat, and laterally extending means for securing said bearing section in place.

8. A steering knuckle member comprising a spindle, an integral pivot bearing section, an integral main section having an interiorly curved seat, a separately formed pivot bearing section fitting against said seat and in line with the integral bearing section, and laterally extending means for securing said separate section in place.

9. In a steering knuckle, the combination with a knuckle member comprising an axle and a pivot pin mounted therein, of a second knuckle member pivoted to the first member comprising a wheel spindle, an integral bearing section surrounding one end of said pivot pin, a second bearing section having a steering lever formed integral therewith, said second section surrounding the other end of the pivot pin, and means for detachably connecting said second section to the wheel spindle.

10. In a steering knuckle, the combination with a knuckle member comprising an axle and a pivot pin mounted therein, of a second knuckle member pivoted to the first member comprising a wheel spindle, an integral bearing section surrounding one end of said pivot pin, a second bearing section having a steering lever formed integral therewith, said second section surrounding the other end of the pivot pin, and means extending laterally on both sides of the pivot pin for removably securing the second bearing section to the wheel spindle.

11. In a steering knuckle, the combination with an axle and a vertical pivot pin secured therein and extending above and below the axle, of a spindle member comprising an integral bearing section, a cup shaped bushing in said section adapted to receive the downwardly extending part of said pivot pin, a section of said spindle member extending upwardly beyond the axle and having a seat, a second bearing section surrounding the upwardly extending part of the pivot pin and resting against said seat, and means detachably securing said second bearing section in place.

12. In a steering knuckle, the combination with an axle and a vertical pivot pin secured therein and extending above and below the axle, of a spindle member comprising an integral bearing section, a cup shaped bushing in said section adapted to receive the downwardly extending part of said pivot pin, a section of said spindle member extending upwardly beyond the axle and having a seat, a second bearing section surrounding the upwardly extending part of the pivot pin and resting against said seat, and means extending laterally through said second bearing section and said upwardly extending section of said spindle member for detachably securing said second bearing section in place.

In testimony whereof I affix my signature.

FRANK J. DRUAR.